United States Patent [19]
Yoshimatsu et al.

[11] Patent Number: 5,961,195
[45] Date of Patent: Oct. 5, 1999

[54] IMAGE DISPLAY DEVICE AND SIMULATION DEVICE

[75] Inventors: Naotaka Yoshimatsu; Hideki Inoue, both of Tokyo, Japan

[73] Assignee: Namco Ltd., Tokyo, Japan

[21] Appl. No.: 08/829,684

[22] Filed: Mar. 31, 1997

[51] Int. Cl.[6] .................................................. G03B 21/14
[52] U.S. Cl. .......................... 353/98; 353/122; 353/30; 353/51; 472/60
[58] Field of Search ................................. 353/28, 13, 30, 353/37, 46, 48, 50, 51, 94, 98, 99, 69, 70; 472/59, 60, 61, 63

[56] References Cited

U.S. PATENT DOCUMENTS

| | | | |
|---|---|---|---|
| 5,116,117 | 5/1992 | Miyashita | 353/30 |
| 5,379,080 | 1/1995 | Onozuka | 353/99 |
| 5,669,685 | 9/1997 | Kotani et al. | 353/28 |
| 5,707,128 | 1/1998 | Dugdale | 353/50 |
| 5,745,305 | 4/1998 | Nalwa | 353/30 |

*Primary Examiner*—William Dowling
*Attorney, Agent, or Firm*—Kent R. Richardson; Wilson, Sonsini, Goodrich & Rosati

[57] ABSTRACT

One embodiment of the invention includes an image display device. The image display device includes a projector for emitting an image, a screen on which the image is projected, and a mirror for reflecting the image from the projector toward the screen. The mirror has a planar surface reflection area and a curved surface reflection area continuous with the planar reflection area. Images projected onto the mirror are reflected with no distortion in one area and distortion in another area. The distorted area fills a portion of a user's peripheral vision. Also, the distorted area allows some embodiments of the invention to provide the user with a greater sense of motion.

20 Claims, 12 Drawing Sheets

IMAGE DISPLAY DEVICE AND SIMULATION DEVICE

RELATED APPLICATIONS

This application relates to Japanese patent application HEI9-24294, filed Jan. 23, 1997, and Japanese patent application HEI9-24295, filed Jan. 23, 1997.

BACKGROUND OF THE INVENTION

1. The Field of the Invention

This invention relates to the field of image display and simulation. In particular, the invention relates to an improved simulation device using an image device that has a curved surface and a flat surface. The image display device improves the immersive feel of the simulation device.

2. Background Information

Previous simulation systems have included display devices that use projectors for projecting images onto a screen. It is generally desirable to have as realistic a simulation as possible. Much of the realism depends upon how large an image is displayed and how well that image is displayed. The size and quality of the image is greatly determined by the display device used in the simulation system.

In some of previous systems, the display device first projects the image onto a mirror which then reflects the image onto a screen. In such an image display device, the usual case is that an undistorted image is projected onto the entire surface of the screen. A more specific example is video game that has a video display projected onto a flat mirror and then reflected onto a screen.

Figure 1A:
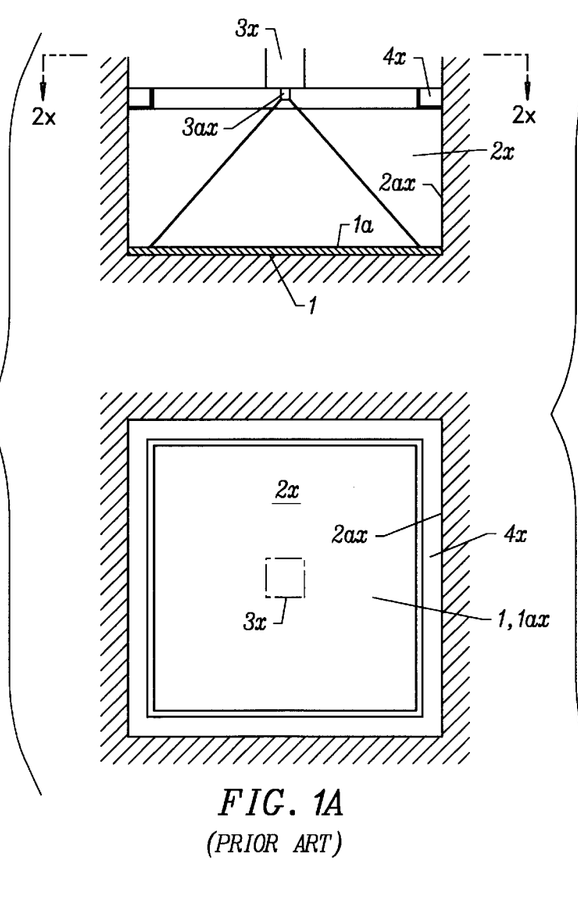
FIG. 1A and FIG. 1B illustrates prior art display devices.
Figure 1B:
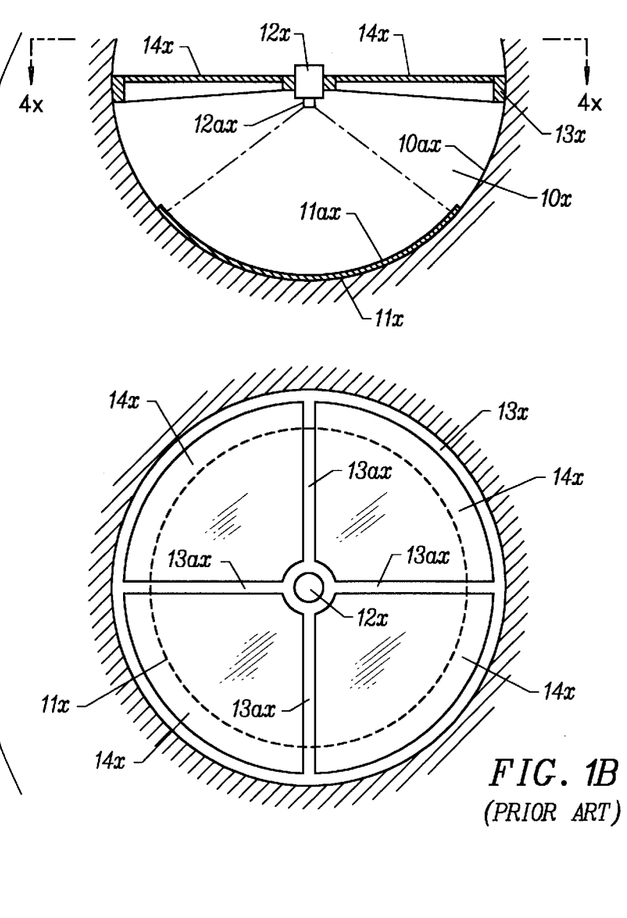

FIG. 1A and FIG. 1B illustrate two prior art systems that video displays that includes curved surfaces, flat surfaces and projectors. In FIG. 1A, a projector 3X projects an image onto a flat surface 1AX. A person (also referred to as a player or user), standing behind the projector 3X, can then see the entire image as displayed by the projection device 3X. FIG. 1B includes a curved surface 11AX. The projector 12X projects onto the curved surface 11AX. The curved surface 11AX can fill more of a person's field of view and provide a more immersive feel. That is, the visual display feels more realistic because more of the person's field of view is filled with images. The systems of FIG. 1A and FIG. 1B are described in Japanese patent application serial number SHO 48-89029. One problem with the above previous systems is that the images are still too small. To provide a more realistic simulation, a larger image is desired.

Figure 2:
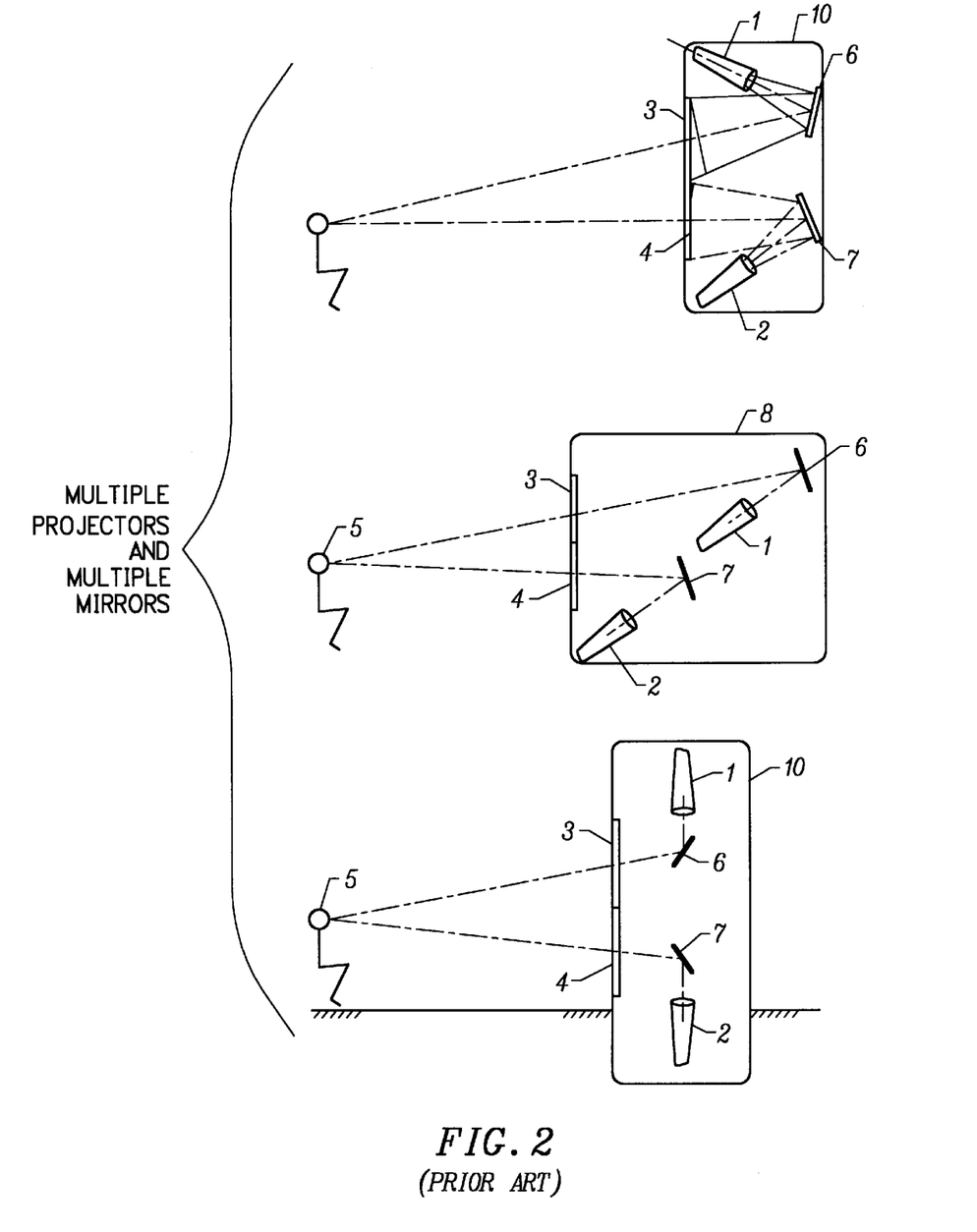
FIG. 2 illustrates prior art display systems that use multiple projectors and multiple mirrors.

Other systems for projecting images use multiple mirrors to generate a larger viewing area for the user. For example, in FIG. 2, three dual mirror systems are shown. Each system has two cameras projecting at two different tilted mirrors. The tilted mirrors project the reflected image onto large screen areas. Each projector/mirror pair projects onto only half of the large screen area. The larger screen areas then provide the user with a more realistic simulation. The systems of FIG. 2 are shown in Japanese patent application serial number HEI 2-91290. As with the systems of FIG. 1A and FIG. 1B, the systems of FIG. 2 suffer from a relatively small image area. For example, little of the user's peripheral vision is filled by the images.

Figure 3:
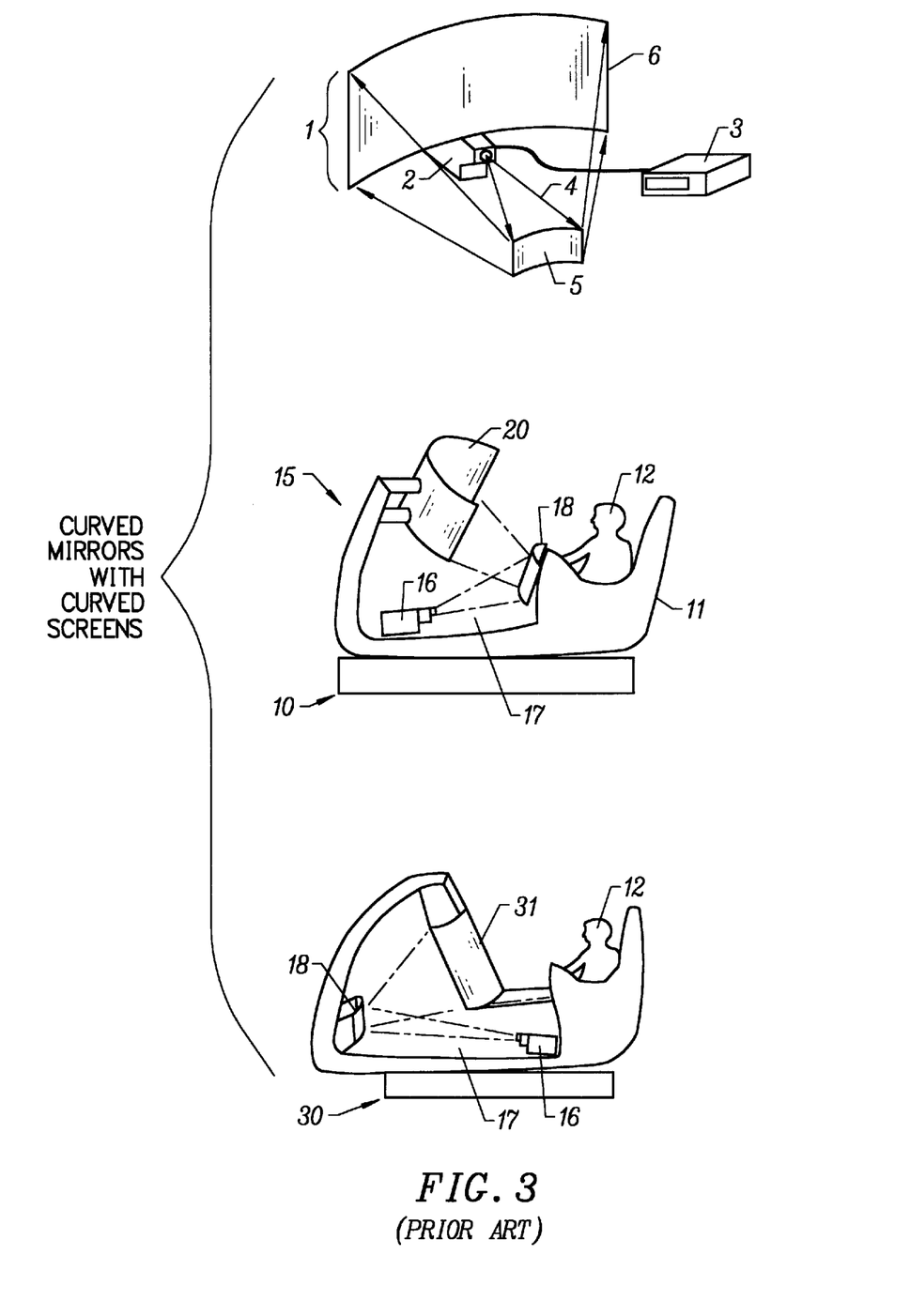
FIG. 3 illustrates prior art simulation systems that use curved mirrors and curved screens.

FIG. 3 illustrates other systems that use curved imaging areas. A projector projects the image onto a curved mirror. The curved mirror then reflects the image onto a curved screen for viewing by a user. This system allows the user to see a relatively large image on a relatively large screen. The image and screen are relatively large with respect to the user's field of view. The systems of FIG. 3 allow the user to view an undistorted image on a large screen. The systems of FIG. 3 help fill the user's peripheral vision but still do not provide a large enough image. Additionally, the images projected are too small to draw attention to the video game in an arcade. Therefore, it is desirable to provide a system that not only provides a display system that will fill a larger part of a player's field of view, but also help draw attention to the video game.

Therefore, what is desired is a system that not only provides a large image that helps fill a user's peripheral vision, but also helps attract potential players to the system.

SUMMARY OF THE INVENTION

An display device for use in a simulation device is described.

One embodiment of the invention includes an image display device. The image display device includes a projector for emitting an image, a screen on which the image is projected, and a mirror for reflecting the image from the projector toward the screen. The mirror has a planar surface reflection area and a curved surface reflection area continuous with the planar reflection area. Images projected onto the mirror are reflected with no distortion in one area and distortion in another area. The distorted area fills a portion of a user's peripheral vision. Also, the distorted area allows some embodiments of the invention to provide the user with a greater sense of motion.

In one embodiment of the invention, the distorted area is enlarged in a direction corresponding to the simulated direction being displayed in the images. Thus, a user's peripheral vision will detect the distortion and have a greater sense of motion.

In another embodiment of the invention, a simulation device includes a display device that partially distorts images created in the simulation device. The distorted images are enlarged in a particular direction. In one embodiment, the direction of enlargement corresponds to a simulated motion.

Although many details have been included in the description and the figures, the invention is defined by the scope of the claims. Only limitations found in those claims apply to the invention.

A BRIEF DESCRIPTION OF THE DRAWINGS

The figures illustrate the invention by way of example, and not limitation. Like references indicate similar elements.

THE DESCRIPTION

An Overview of an Embodiment of the Invention

One embodiment of the invention includes a simulation device having an image display device. The image display device includes a projector and a mirror. The mirror has a flat, or planar, area and a curved, or non-planar, area. The flat area reflects the main portion of the simulation images while the curved area reflects a second portion of the simulation images. The curved area reflects the second portion to cover a large area and to distort the second portion in a particular direction. The flat portion maintains the image quality of the reflected image. The curved portion allows the projection of part of the image onto a much larger area while providing a more realistic feeling of motion to the user. The projection onto the much larger area also helps to attract attention to the simulation device.

In one embodiment of the invention including a display device, the image reflected by the planar surface of the mirror, and projected onto the screen, is a normal image without distortion. Such a reflected image provides a realistic image for the user. Character information and the like can be accurately shown to the user in such an image. The image reflected by the curved surface, and projected onto the screen, is distorted according to the curvature of the curved surface. The person watching the undistorted image will see the distorted area in his or her peripheral vision. The distorted images provide an immersive feel to the simulation. For example, the user will feel as if he or she is in the middle of the scene. Importantly, in one embodiment, the undistorted image is seamlessly displayed with the distorted image.

Simulation System

Figure 4:
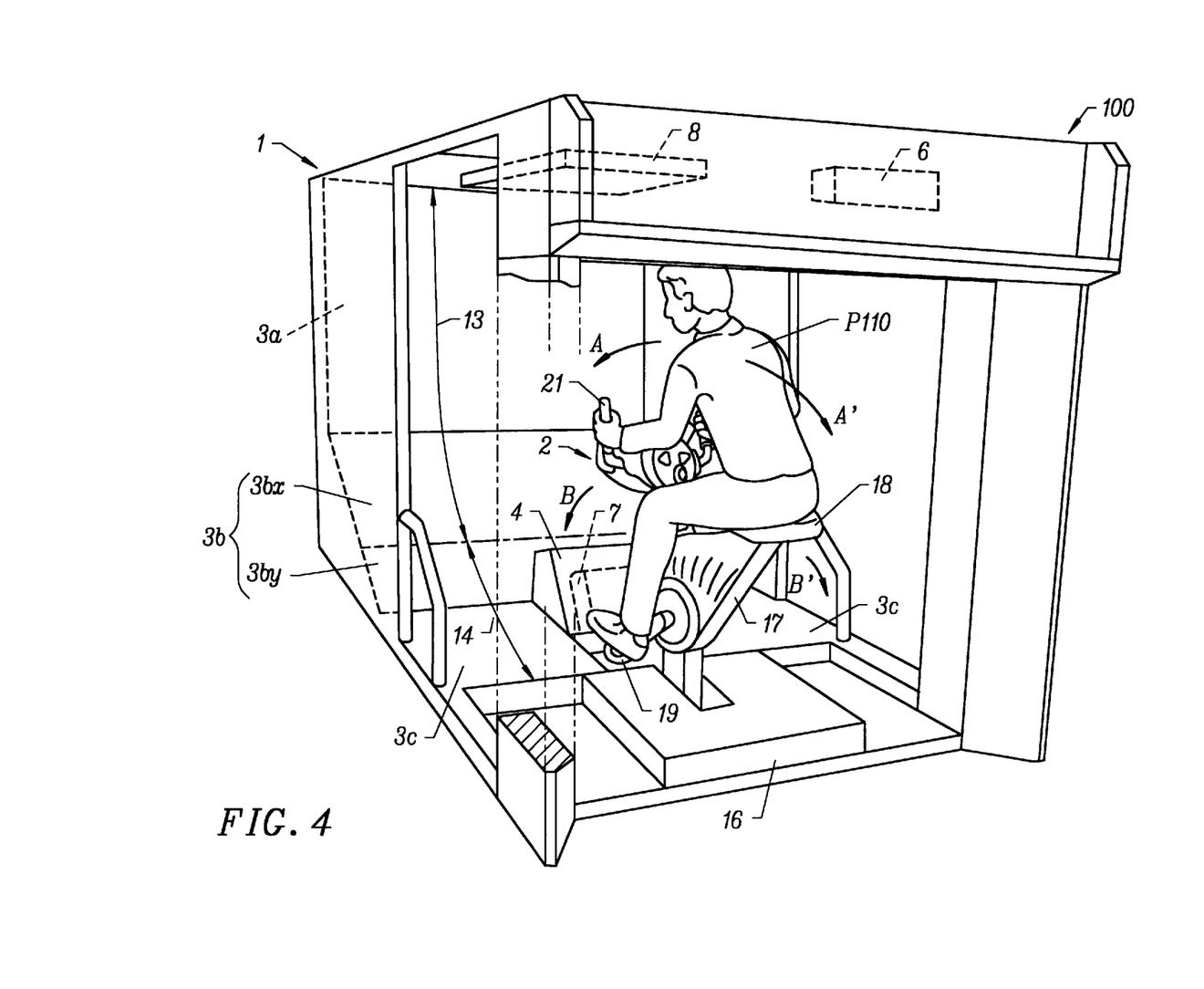
FIG. 4 illustrates a simulation system including one embodiment of the invention.

FIG. 4 illustrates one embodiment of the invention that includes an image display device and simulation device. In this embodiment, a video game is illustrated as the simulation device. The video game, in this example, is a game where a player steers a man-powered airplane. The purpose of the video game is to fly and collect as many balloons as possible in a limited amount of time, in a predetermined course, without having a collision with any obstacles in the course. The following paragraphs first list all the elements of FIG. 4, then describe the function of the elements and their operations.

The elements of FIG. 4 are as follows: a video game system 100 and a player 110. The video game system 100 includes the following elements: a game machine housing 1, an input device 2, a screen 3, a projector case 4, an upper liquid crystal projector 6, a lower liquid crystal project 7, and a reflection mirror 8. The screen is made of a front screen 3A, an inclined screen 3B, and a floor screen 3C.

The following describes the function of the elements and their operations.

The game machine housing 1 houses the elements of the video game system 100 and provides and environment for he player 110 to enjoy a simulation. The user interacts with the input device 2 to control the simulation. This interaction is described in greater detail below.

The upper liquid crystal projector 6 displays an image directly onto the front screen 3A. In one embodiment, the image is generated to simulate an environment for playing a game.

The lower liquid crystal projector 7, housed in the projection case 4, displays images on the reflection mirror 8. The reflection mirror 8 reflects a reflected image onto the inclined screen 3B and the floor 3C. The combination of the two projectors allows the player 110 to see an undistorted image on the front screen 3A and the inclined screen 3B. The player 110 can also see a distorted image displayed on the inclined screen 3B and on the floor screen 3C. Thus, the user has an image displayed in front of him/her and underneath him/her. Having the image so displayed provides in immersive field to the video game system 100.

Figure 5:
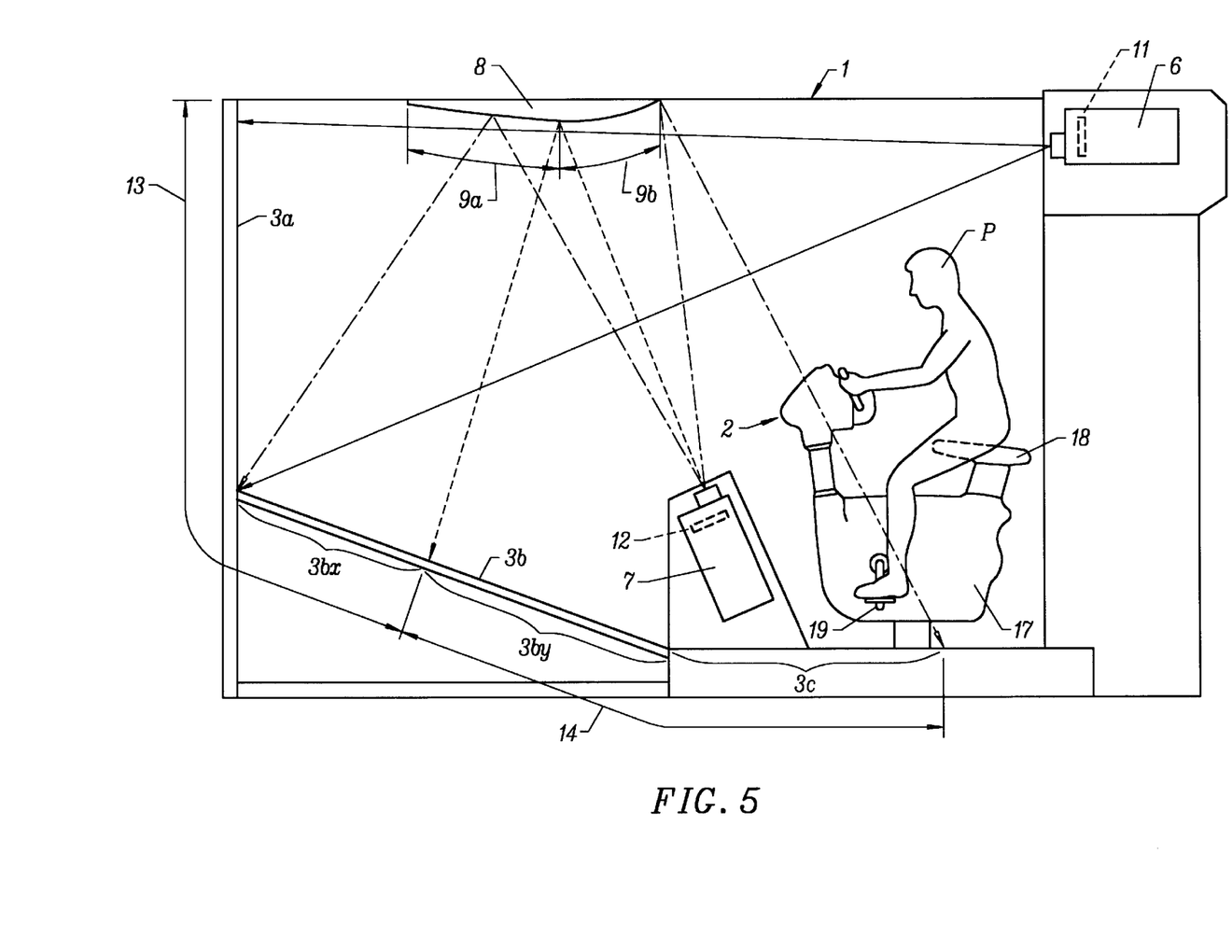
FIG. 5 illustrates a cross-sectional view of the system of FIG. 4.

FIG. 5 illustrates a cross-sectional view of the video game system 100 shown in FIG. 1. The reflection mirror 8 is shown to include two distinct areas: a planar surface reflection mirror 9A and a curved surface reflection mirror 9B.

FIG. 5 also illustrates that the upper liquid crystal projector 6 displays an image on the entire surface of the front screen 3A. The lower liquid crystal projector 7 projects an image onto the reflective surface of he reflection mirror 8. The reflection mirror 8 reflects the projected image onto the inclined screen 3B and the floor screen 3C. The image projected onto the inclined screen 3B is broken into two parts, an undistorted image in area 3BX and a distorted image in area 3BY. The distorted image continues down into the floor screen 3C.

Thus, the player 110 sees an undistorted image in area 13 and a distorted image in area 14. A normal projection, or undistorted image, is an image that is enlarged approximately by the same amount in a vertical and horizontal direction. That is, the aspect ratio of the image is maintained. The distorted images are images where the aspect ratio is not maintained across the image. For example, the image projected in area 14, from the reflective surface 9B, has an enlargement in the vertical direction of the image that is greater than the enlargement in the horizontal direction of the image. The distorted image, when displayed on the floor, has a stage effect where the image is enlarged in only one direction according to the curvature of the reflection area 9B.

Importantly, in one embodiment of the invention, these reflected images provide a stage effect for attracting the attention of a potential player or an audience. Importantly, in one embodiment, to obtain even some of these advantages, the player 110 not need see the entire distorted image. However, the people passing by the video game system 100 will see the stage effect and will be attracted to the game.

Note that the images reflected onto the floor are actually projected onto the feet of the player 110. This helps to immerse the player 110 into the game by surrounding the player 110 with images.

As noted above, the input device 2 allows the user to control the simulation. The following describes the input device 2 and the related elements. These elements include the input device 2, a base support 16, and an oscillating body 17. The oscillating body 17 is supported by the base support 16 so that the oscillating body can oscillate in a backward and forward direction shown by an arrow A–A'. The oscillating body 17 also allows for a movement in the right and left direction shown by the arrow B–B'. The oscillating body 17 includes a saddle 18 on which the player 110 can sit. The oscillating body also has pedals 19 which can be pumped by the player 110.

In one embodiment of the video game system 100, the player 110 pumps the pedals 19 to advance a man-powered airplane image projected on the main screen 13 in a virtual image space. Furthermore, the traveling speed of the man-powered airplane image can be adjusted by the speed of the pumping of the pedals 19. Therefore, the pedals 19 include a rotation sensor, which can be used to detect the speed at which the pedals are being pumped.

The oscillating body 17 also includes handles 21. The player 110 steers the man-powered airplane by gripping the handles 21. The handles 21 include an angle sensor which provides feedback to the video game system 100.

Figure 6:
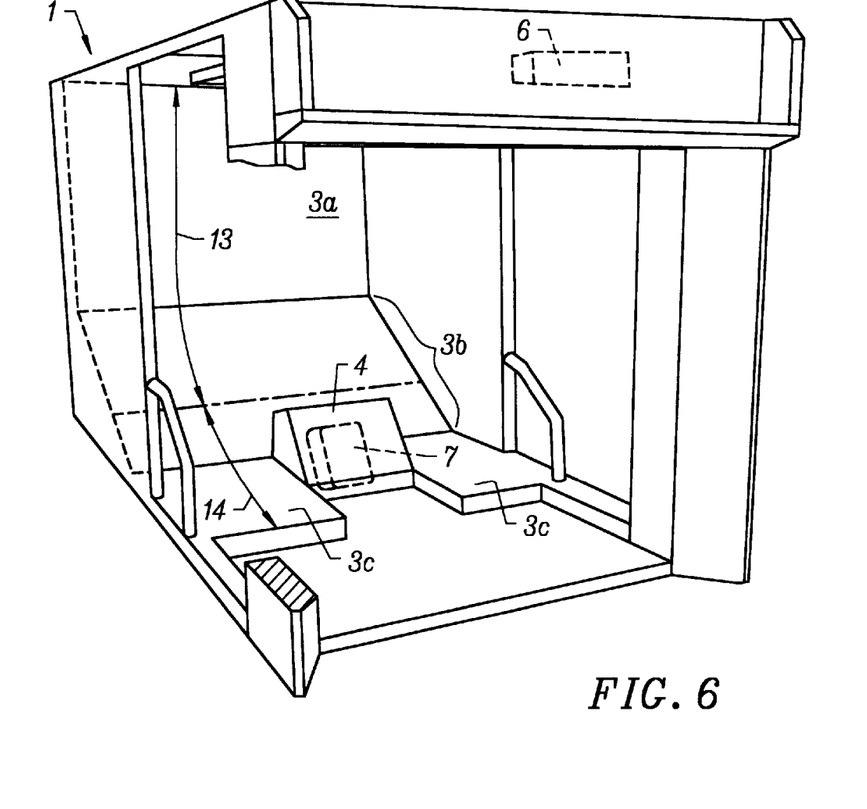
FIG. 6 illustrates a third view of the system of FIG. 4.

FIG. 6 illustrates one embodiment of the video game system 100 from a perspective view where the base 16 and oscillating body 17 are not shown.

Figure 7:
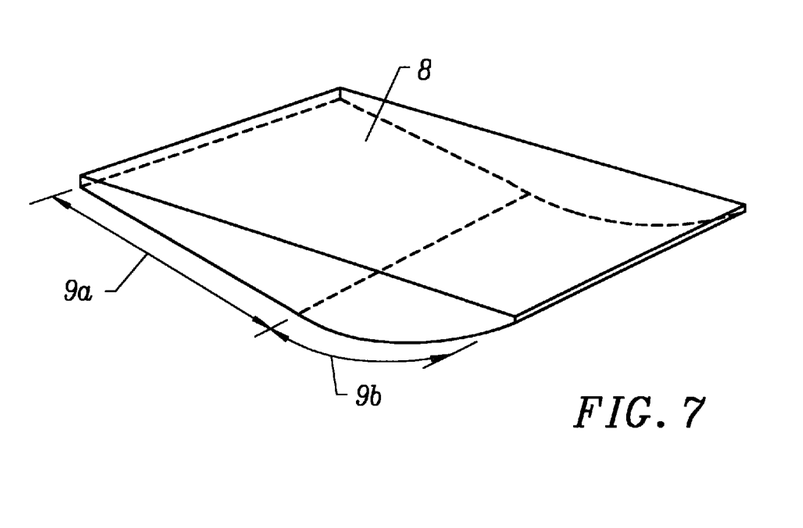
FIG. 7 illustrates a mirror used in one embodiment of the invention.

FIG. 7 illustrates one embodiment of the reflecting mirror 8.

Image Display

Figure 8:
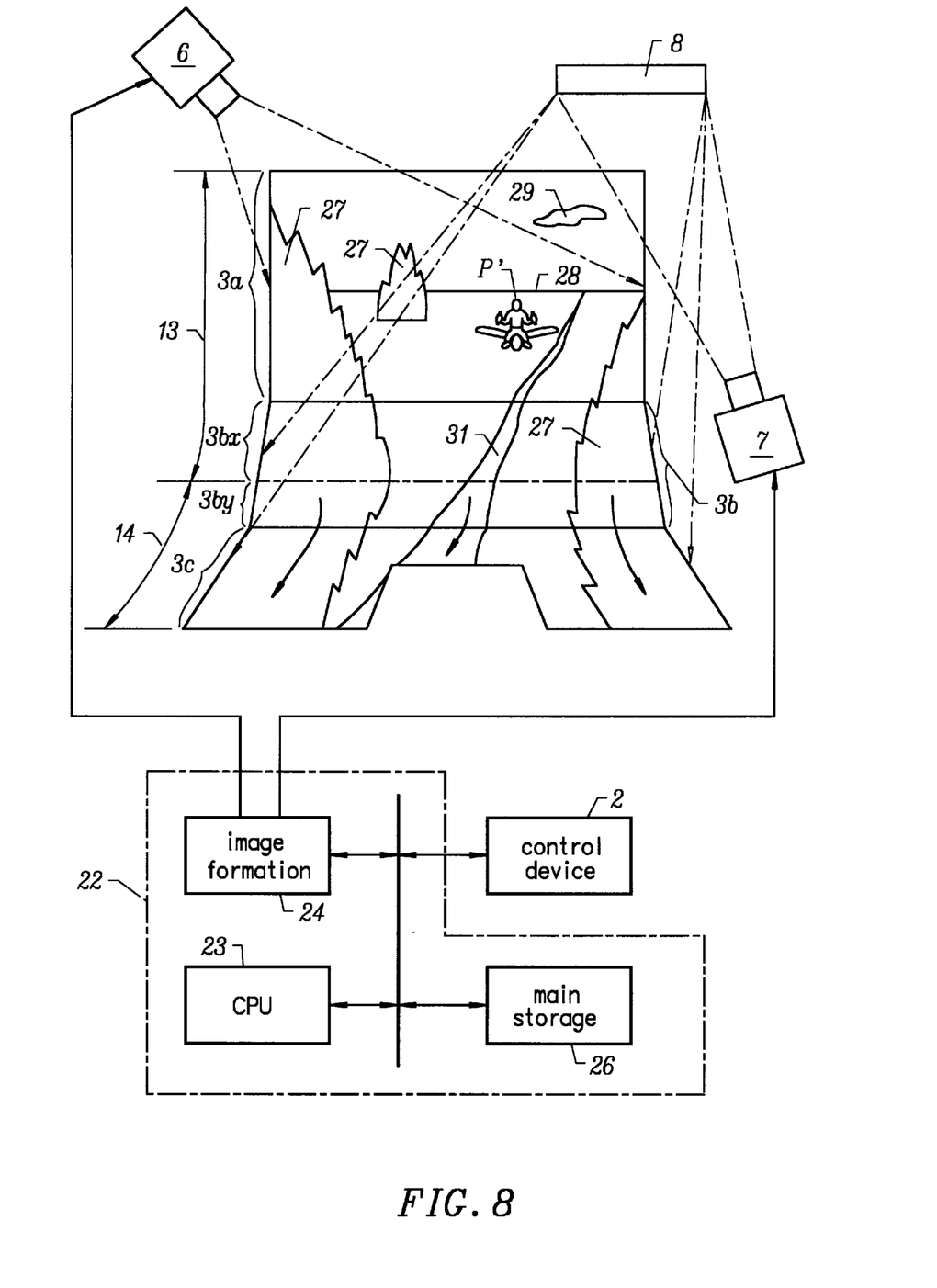
FIG. 8 illustrates images displayed, and the circuits for displaying those images, in one embodiment of the invention.

FIG. 8 illustrates one embodiment of the images displayed in the undistorted area 13 and the distorted area 14. FIG. 8 also illustrates some of the electronic components used to control the display of the images.

The video game system 110 includes an electronic control system 22 disposed in a position inside or outside of the game machine housing 1. The control system 22 includes a CPU 23, an image formation circuit 24, and a main storage 26. The CPU 23 is for performing various operations and controlling the video game system 100. The image formation circuit 24 is for controlling the action of the upper liquid crystal projector 6 and the lower liquid crystal projector 7. The main storage 26 stores programs for advancing the game.

The following paragraph Describes the operation of the video game system 100 in one embodiment of the invention. The player 110 sits on the saddle 18 and places his or her legs on the pedals 19. The player 110 then grips the handles 21 with both hands, and waits until the visual field image is projected in the undistorted area 13 and the distorted area 14. When the game is started, for example, a Rocky Mountain image 27, a horizontal line image 28, a cloud image 29, and a river image 31, are projected as the visual field images. Also, a player's image in a virtual man-powered airplane is projected.

The visual field image is projected so that the visual image moves in a certain direction from the inner part of the screen to the sides. Therefore, the player's image P' is projected so that he/she flies relatively in forward direction in the virtual space displayed with the visual field image. The traveling speed of this player's image is programmed to be adjusted by changing the pumping speed of the pedals 19. Furthermore, the player's image is programmed in advance such that it moves in the screen with the steering action of the handles 21 by the player 110. The player 110 advances the player's image by pumping the pedals 19 as fast as possible, while steering the handles 21, so that the airplane does not collide with a Rocky Mountain image 27.

During the playing of the game, the player 110 operates the handles 21 and the like while watching the image projected on the main screen 13. Since, on this main screen 13, there are projected undistorted images from the upper projector 6 and undistorted images from the lower projector 7, through the planar surface reflection area 9A, the player 110 can enjoy the game, while accurately recognizing visual field images and character information and the like.

However, the player 110 advances a game while partly recognizing images on the subscreen 14 though not paying particular attention to those images. On the sub-screen 14, there is projected a distorted image from the lower projector 7, through the curved reflection area 9B of the reflection mirror 8. The distorted image is distorted in the moving direction of the visual field image. This distorted image moves so as to flow backward behind the player 110 with the movement of the visual field image. Thus, on the sub-screen 14, an image flowing away from the player can be recognized with the movement of the visual field image. Since the image flowing away is a distorted image enlarged in the flowing direction, the player 110 can enjoy the game while experiencing a feeling that his or her body is surrounded by visual field images moving at high speeds. The player 110, and any audience around the player 110, can watch a normal image on the main screen 13, and at the same time, watch an image with, a stage effect, without a sense of incompatibility.

Alternative Embodiments

The following describes other embodiments of the invention.

In FIG. 4, the main screen 13 and the sub-screen 14 are constructed by coupling three kinds of screens, the front screen 3A, the front screen 3B and the floor screen 3C. In another embodiment the main screen 13 and the sub-screen 14 are made of one large screen.

Figure 9:
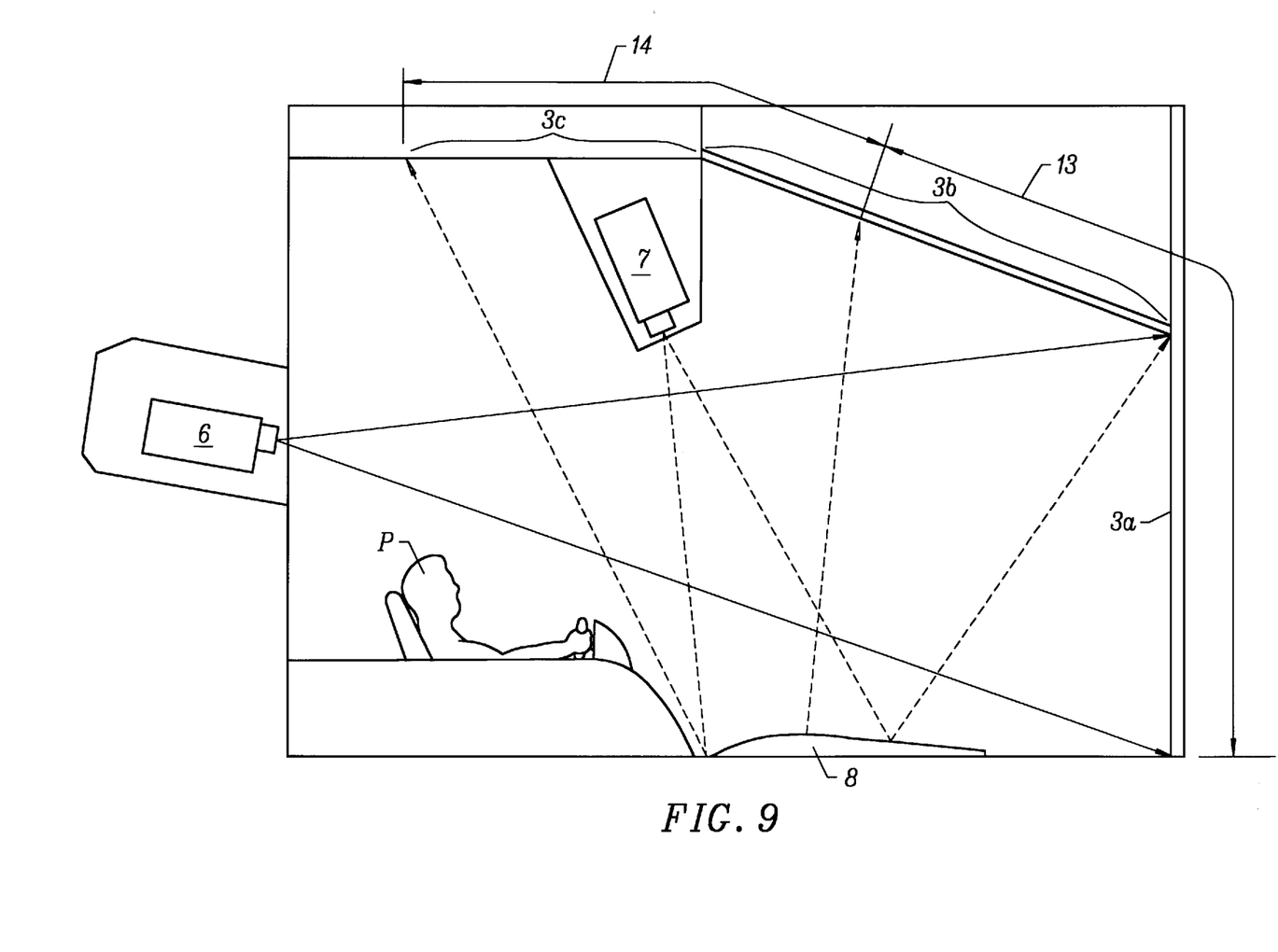
FIG. 9 illustrates another embodiment of the invention.

FIG. 9 illustrates another embodiment of the invention. The reflection mirror 8 is placed on the floor of the video game system 100. The lower liquid crystal projector 7 is now included in the ceiling of the video game system 100. Thus, the distorted image area 14 is on the ceiling of the video game stem 100. Thus, the player 110 will have the feeling of the motion as images fly over his/her head.

Figure 10:
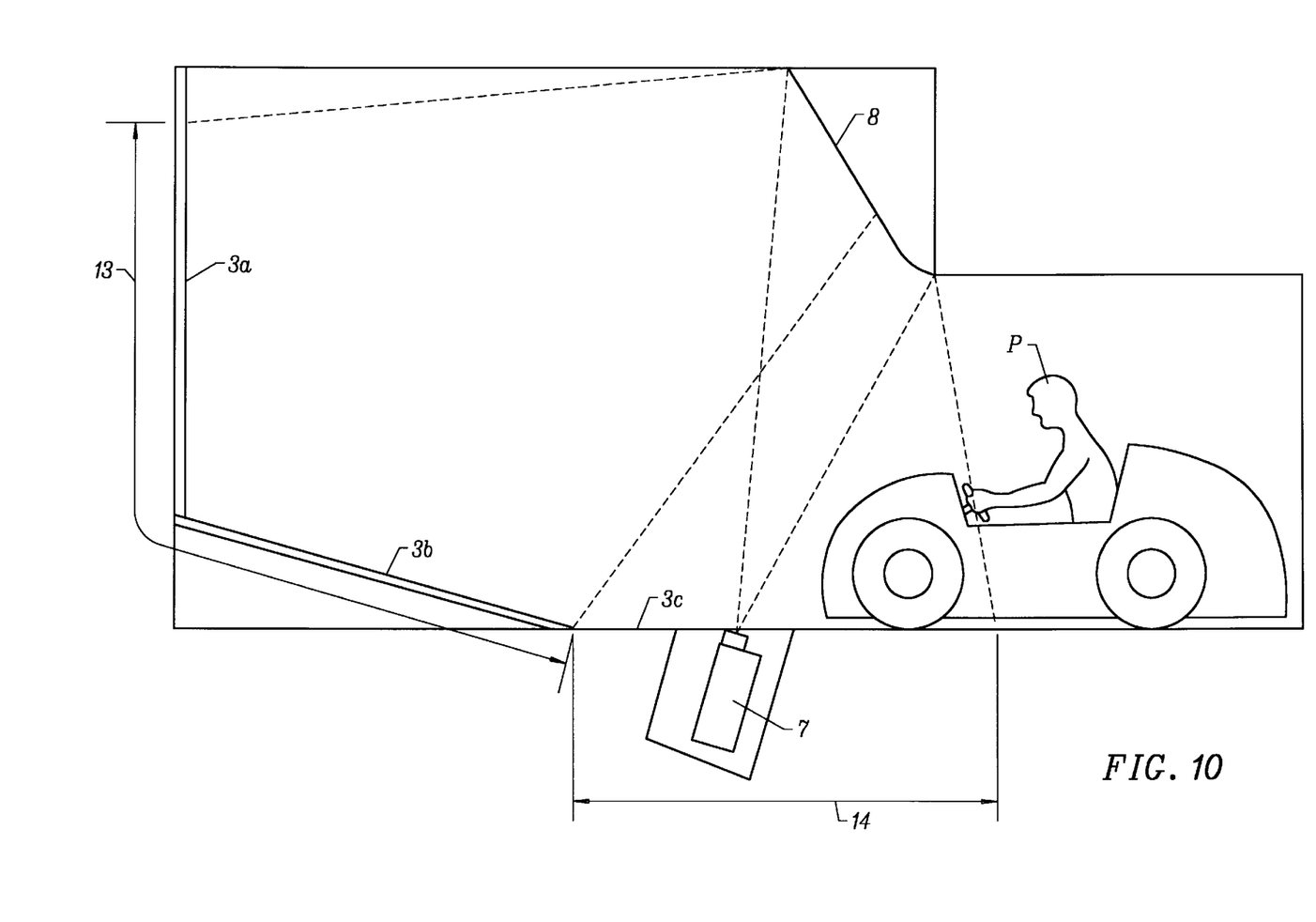
FIG. 10 illustrates another embodiment of the invention.

In another embodiment of he invention, only one projector is used. Such an embodiment is constructed by modifying the position of the lower projector 7 and the size and shape of the reflection mirror 8. FIG. 10 illustrates such an embodiment of the invention where only a single projector is used. The reflective mirror 8 reflects an image onto the undistorted screen area 13. The distorted screen area 14 is projected onto the floor of the video game system 100. This embodiment of the invention has the advantage that only one projector is needed.

In one embodiment, a projector, other than a liquid crystal display projector, is used.

In another embodiment of the invention, other devices are used other than game devices. In another embodiment of the invention, other game devices are included such as a driving simulation device, a skiing simulation device, a snowboard simulation device, and other optional simulation devices. These game devices will also benefit from the stage effects provided by the distorted image.

Figure 11:
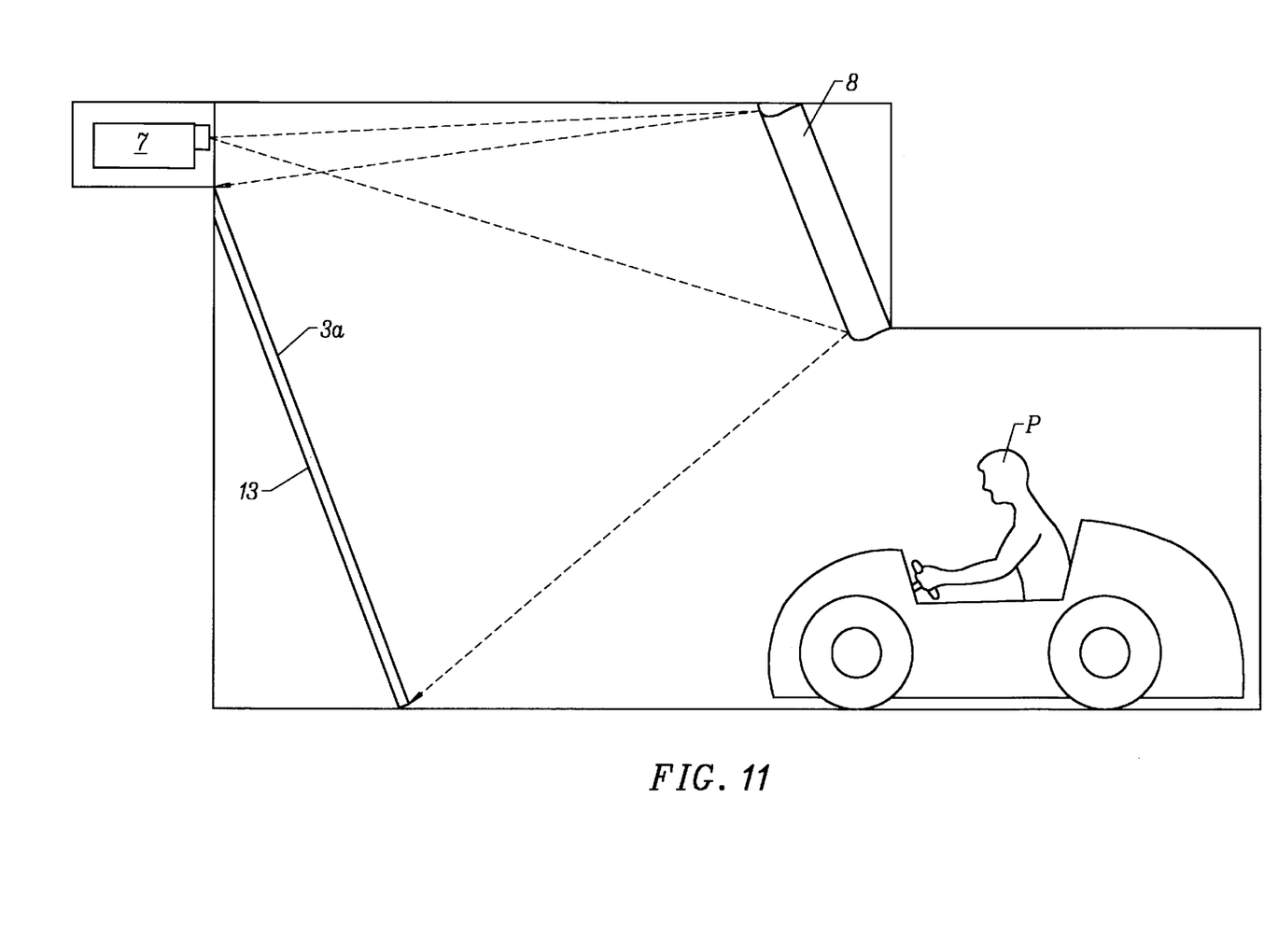
FIG. 11 illustrates another embodiment of the invention.
Figure 12:
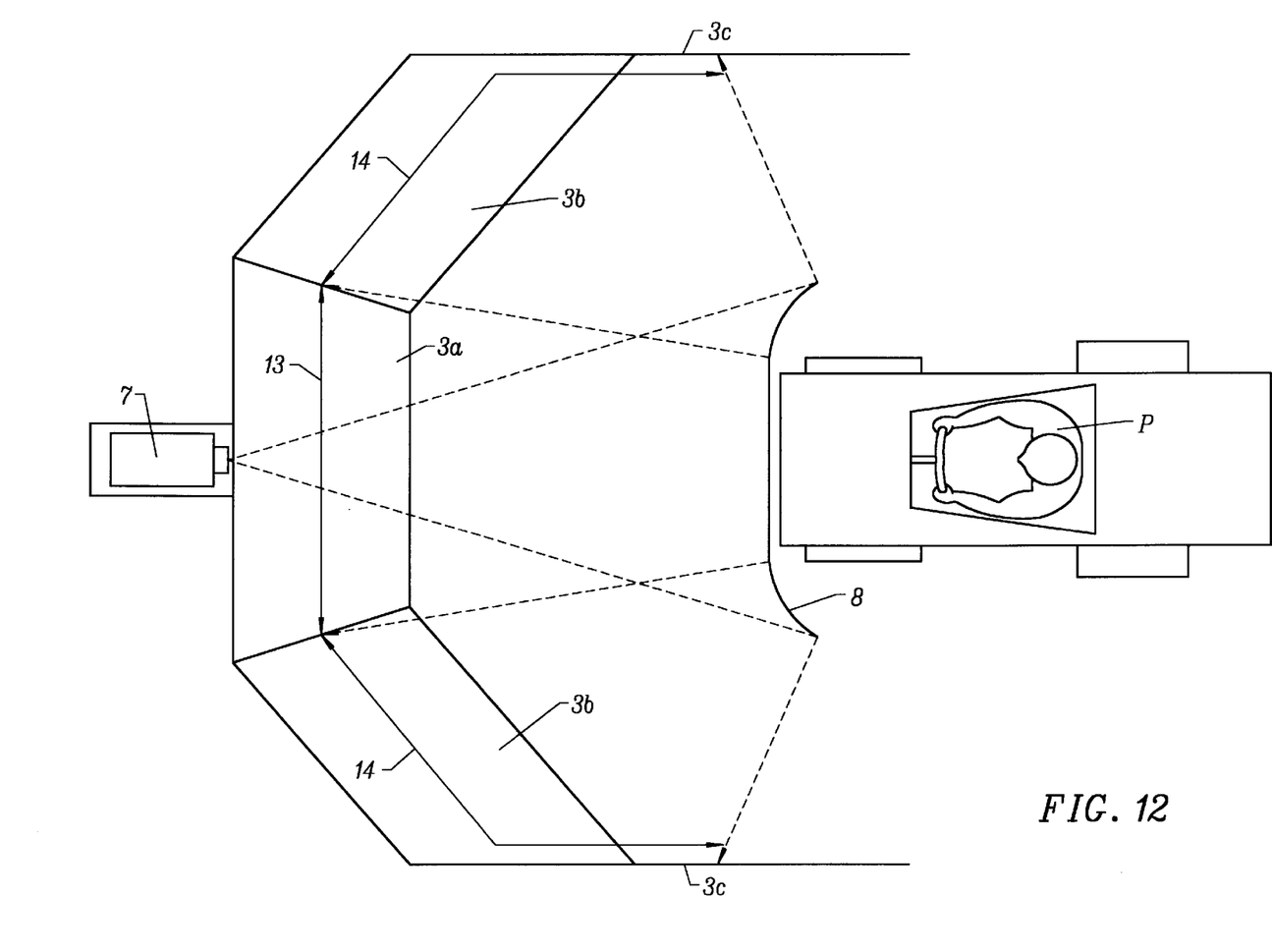
FIG. 12 illustrates another embodiment of the invention.

FIG. 11 illustrates another embodiment of the invention. The embodiment of FIG. 11 includes the reflective mirror having a curved portion that reflects images from the projector 7 out to the side periphery of he player 110. That is, distorted images appear at the left and right periphery of the player 110. FIG. 12 illustrates another embodiment of the invention where the curved surfaces of the reflective mirror 8 are used to distort images to the left and right of the player 110.

Figure 13:
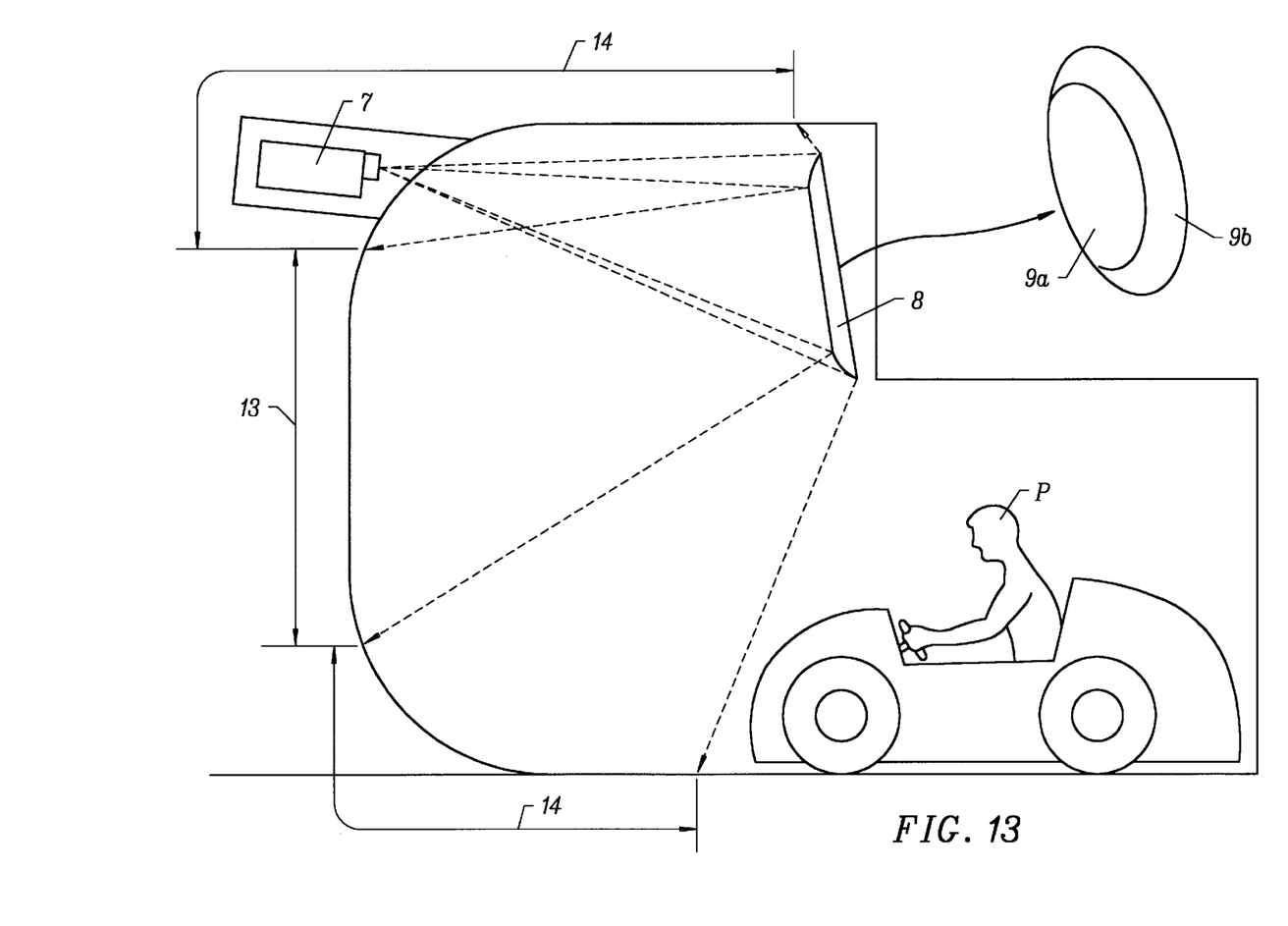
FIG. 13 illustrates another embodiment of the invention.

FIG. 13 illustrates one embodiment of the invention where the reflective mirror 8 is curved around the edges of the mirror. The images from the liquid crystal projector 7 are distorted all around the periphery of the player's viewing area.

In another embodiment, a lumber of planar surface reflection areas and curved surface reflection areas are included in one reflection mirror 8. In another embodiment, a curved surface reflection area is included in a reflection mirror at a position other than the end portions of the reflection mirror.

Conclusion

Thus, a simulation device and display device have been described. The display device provides a user with a more immersive feel to the game by providing a greater sense of motion in the periphery of the user's field of view. The motion sense is enhanced by elongating images in the direction of the simulated motion of the simulation device. The distorted images also help attract users to the simulation device.

What is claimed is:

1. An image display device comprising a projector for emitting an image, the image including moving images, at least a portion of the moving images appearing to move in a first direction, a display surface on which the image is projected, and a mirror for reflecting the image from the projector toward the display surface, wherein the mirror has a planar surface reflection area and a curved surface reflection area continuous thereto, the mirror being curved to distort the image in the first direction.

2. An image display device according to claim 1, wherein the curved surface reflection area is provided at an end portion of the mirror.

3. An image display device according to claim 1, wherein the image display device defines a watching area for watching the image, wherein the screen is positioned in front of the watching area, and the curved surface reflection area is provided at an end portion of the mirror on a side closest to the watching area.

4. An image display device comprising a projector for emitting an image, a display surface on which the image is projected, and a mirror for reflecting the image from the projector toward the display surface, wherein the mirror has a planar surface reflection area and a surface surface reflection area continuous thereto, the mirror being curved to distort the image to give the illusion of motion, wherein the image display device has an image control circuit for controlling the image emitted from the projector, the image control circuit further for driving the projector so as to project an image moving in a first direction on the display surface, and the planar surface reflection area corresponding to an image that appears to be moving towards a reference position in the first direction, and a curved surface reflection area corresponding to an image that appears to be moving away from a reference position in the first direction.

5. A simulation device comprising:
 a projector for emitting an image, the image including moving images, at least a portion of the moving images appearing to move in a first direction;
 a display surface on which the image is projected;
 an input device for generating position information responsive to being manipulated;
 a reflective surface for reflecting the image from the projector towards the display surface, the reflective surface having a planar surface reflection area and a curved surface reflection area continuous thereto, the curved surface to distort the image in the first direction.

6. A simulation device according to claim 5, wherein the curved surface reflection area is provided at the end portion of the reflective surface on the side close the input device.

7. A simulation device according to claim 5, wherein the reflective surface is positioned above the input device.
 a main display for displaying a main image; and a subdisplay disposed continuously with the main display, the subdisplay for displaying a distorted image, the distorted image being at least partially distorted along a first axis so as to provide an illusion of movement along the first axis.

8. A simulation device comprising:
 a projector for emitting an image;
 a display surface on which the image is projected;
 an input device for generating position information responsive to being manipulated;
 a reflective surface for reflecting the image from the projector towards the display surface, the reflective surface having a planar surface reflection area and a curved surface reflection area continuous thereto, the reflective surface being curved to distort the image to give the illusion of motion, further including an image control circuit for controlling the image emitted from the projector, the image control circuit causing the projector to project the image on the display surface so as to provide the appearance of motion in a first direction, and the planar surface reflection area corresponding to an image that appears to be moving towards a reference position in the first direction, and a curved surface reflection area corresponding to an image that appears to be moving away from a reference position in the first direction.

9. An image display device comprising:
 a main display for displaying a main image; and
 a subdisplay disposed continuously with the main display, the subdisplay for displaying a distorted image, the distorted image being at least partially distorted along a first axis so as to provide an illusion of movement along the first axis.

10. An image display device according to claim 9, wherein the main display is positioned in front of a viewing area, the main display is for projecting an image moving from a front position of the viewing area toward a back position of the viewing area.

11. An image display device according to claim 9, wherein the image display device is positioned in front of a viewing area, the first axis is parallel to a line from the front of the viewing area to the back of the viewing area, the distorted image is enlarged along the first axis by a greater amount than the distorted image is enlarged along an second axis different from the axis.

12. An image display device according to claim 9, wherein the subdisplay is positioned to project the distorted portion if the distorted image below the main image.

13. An image display device according to claim 12, wherein the subdisplay is further positioned to project any undistorted portion of the distorted image above the distorted portion and below the main image.

14. An image display device according to claim 9, wherein the subdisplay includes a projector for emitting a second image, the distorted image being derived from the second image, and the subdisplay also includes a screen on which the distorted image is displayed.

15. An image display device according to claim 14, wherein the main display also includes the screen, and wherein the subdisplay further includes a reflection surface which reflects the second image toward the screen, the reflection surface having a planar surface reflection area and a curved surface reflection area continuous thereto, and wherein an undistorted image reflected from the planar sur ace reflection area is displayed on the screen continuously with the main image, and the distorted portion of the distorted image is reflected from the curved surface reflection area is displayed on the screen continuously with the undistorted image.

16. A simulation device comprising:

a main display means for displaying a main image;

a subdisplay means for splaying a second image, the subdisplay means being disposed to display the second in age continuously with the main image, the second image including a distorted image portion, the distorted image portion being distorted in a direction defined between a point in the main image and a point in the second image; and an operation inputting means being positioned to allow viewing of the main image, the operation inputting means for receiving user input.

17. A simulation device according to claim 16 wherein the operation inputting means is positioned partially in the are displaying the second image.

18. An image display device comprising a projector for emitting an image, a display surface on which the image is projected, and a mirror for reflecting the image from the projector toward the display surface, wherein the mirror has a planar surface reflection area and a curved surface reflection area continuous thereto, the mirror being curved to distort the image to give an illusion of motion and wherein the curved surface reflection area is provided at two opposing end portions of the mirror.

19. An image display device comprising a projector for emitting an image, a display surface on which the image is projected, and a mirror for reflecting the image from the projector toward the display surface, wherein the mirror has a planar surface reflection area and a curved surface reflection area continuous thereto, the mirror being curved to distort the image to give an illusion of motion and wherein the curved surface reflection area is provided all around the edges of the mirror.

20. An image display device according to claim 1, further comprising a second projector for emitting a second image, the second image being displayed contiguously with the image.

* * * * *